United States Patent Office 2,803,866
Patented Aug. 27, 1957

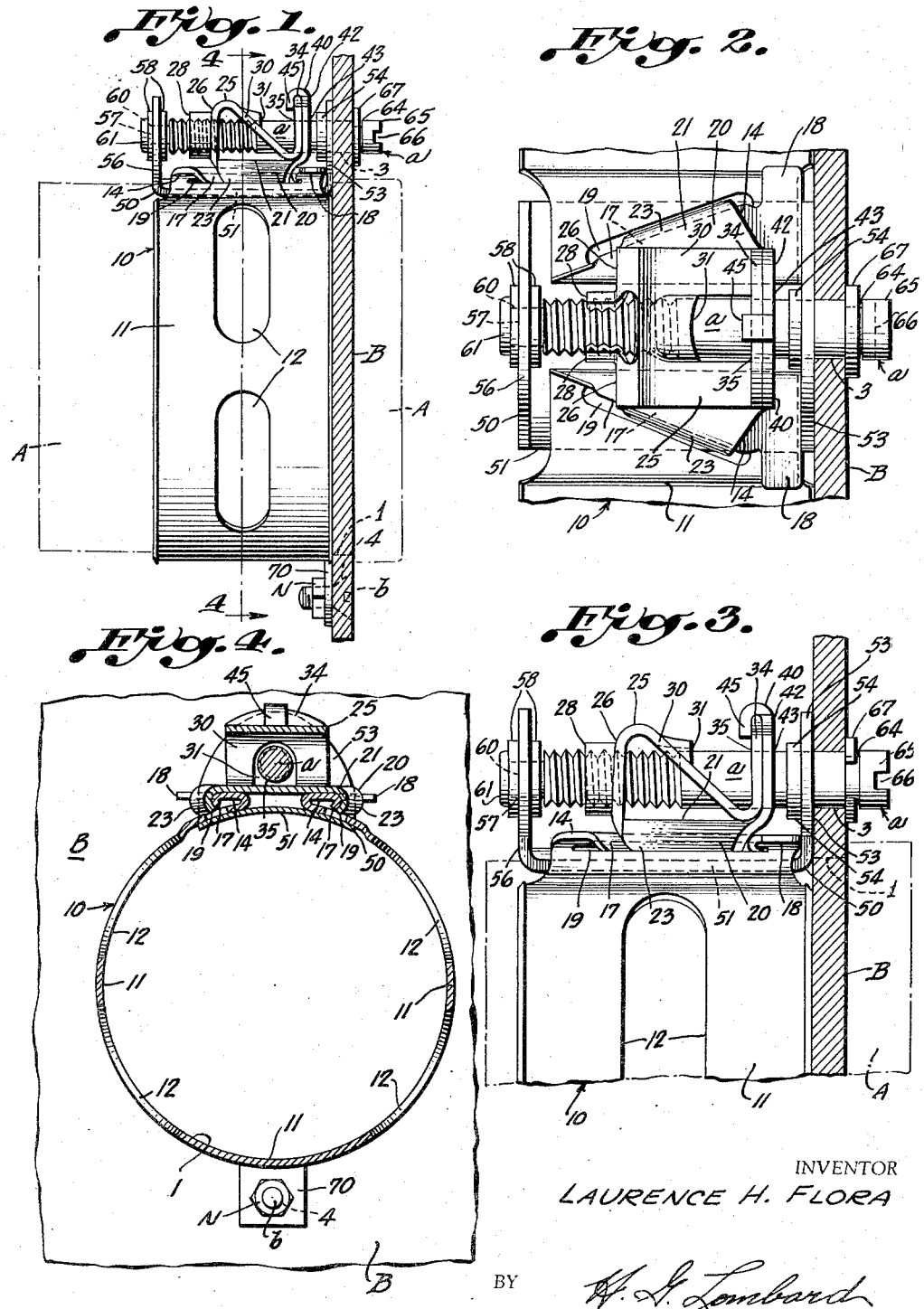

2,803,866

BAND CLAMP WITH AXIAL MANIPULATING MEANS

Laurence H. Flora, Cleveland, Ohio, assignor to Tinnerman Products, Inc., Cleveland, Ohio, a corporation of Ohio Application June 29, 1953, Serial No. 364,659

8 Claims. (Cl. 24—268)

This invention relates in general to instrument mountings and deals, more particularly, with an improved construction for an instrument mounting clamp which is adapted to be attached to the inner or rearward side of an instrument panel, or the like, and manipulated from the outer or forward side of the panel in an arrangement in which the instrument is adapted to be easily and quickly installed or removed by an operation taking place entirely from the readily accessible outer or forward side of the instrument panel.

The invention has particular application in instances where instruments must be frequently mounted and dismounted as in airplane installations, for example, where periodic repairs and check of the instruments for accuracy are necessary.

A primary object of the invention is to provide an improved instrument mounting clamp of the kind described in the form of a simplified, lightweight all sheet metal construction which is readily attached to the rearward side of an instrument panel by screws extending through the customary screw holes in the instrument panel and with one or more of said screws arranged for manipulation entirely from the outer side of said instrument panel for mounting or dismounting the instrument without need for access to the inner or rearward side of the instrument panel.

A further object of the invention is to provide an all sheet metal instrument clamp, such as described, in which the securing means of the clamp comprises a simplified sheet metal yoke or saddle in a wedge-shaped construction providing for a progressive tightening or loosening of the instrument clamp.

Another object of the invention is to provide an all sheet metal instrument clamp of this character comprising such a wedge-shaped sheet metal yoke in a reinforced construction, and further, with said yoke or saddle including an integral nut structure adapted for self-locking action with the securing bolt or screw of the clamp in applied position.

Further objects and advantages, and other new and useful features in the construction, arrangement and general combination of elements and details of construction of the improved instrument mounting clamp of the invention, will be readily apparent as the following description proceeds with reference to the accompanying drawings, for purposes of illustration but not of limitation, in which like reference characters designate like parts throughout, and in which:

Fig. 1 is a vertical sectional view through an instrument panel showing the improved instrument mounting clamp of the invention in elevation as attached to the rearward side of the instrument panel and adapted to be manipulated from the forward side of the instrument panel for mounting or dismounting an instrument, represented in broken lines;

Fig. 2 is a fragmentary top plan view of Fig. 1 showing, on an enlarged scale, the elements of the securing means of the instrument clamp;

Fig. 3 is a front elevational view of Fig. 2 showing the elements of the securing means of the clamp from the side thereof; and, Fig. 4 is a vertical sectional view along line 4—4 of Fig. 1, looking in the direction of the arrows.

Referring now, more particularly, to the drawings, Fig. 1 illustrates a typical installation of an instrument A, represented in broken lines, which is mounted on an instrument panel or board B in an operation taking place entirely from the outer or forward side of said instrument panel through the use of the improved clamp of the present invention. The instrument panel B is provided with a suitable opening 1 for receiving the instrument A and a pair of screw holes 3, 4, on opposite sides of said opening 1 for receiving the bolts or screws a, b, respectively.

The instrument mounting device, designated generally 10, is in the general form of a split collar or band 11 defining an expansible and contractible clamp in a size approximating the circumference of the instrument A and slightly larger than the instrument receiving opening 1 in the panel B. The clamp is adapted to be attached to the rearward side of the instrument panel B in line with the opening 1 therein and otherwise manipulated from the forward side of said instrument panel B either to secure the instrument A in the opening 1 or to release the same therefrom, without need for access to the rearward side of said instrument panel B.

The split collar or band 11 and associated parts are all made in a simplified, lightweight construction of any suitable sheet metal preferably spring metal or cold rolled metal having spring-like characteristics. Preferably, the split band or collar 11 is provided with cutouts 12 on its periphery for minimizing its weight without materially reducing the strength thereof. The split band or collar 11 is formed with angularly shaped end portions 14 which are return bent to extend outwardly in opposite directions from each other in a manner whereby the outer edges of said end portions 14 define V-shaped or wedge-shaped shoulders 17 in a progressively increasing spacing or width from the rear toward the front of the clamp and terminating adjacent outwardly projecting ears 18 serving as stops.

The body of the split band or collar 11 adjacent said V-shaped shoulders 17 is provided with suitable V-shaped clearance slots 19 immediately below and in line with said shoulders 17. The stops 18 and clearance slots 19 are provided in operative association with mating elements on the cooperating slidable yoke or saddle 20, as presently to be described.

The slidable yoke or saddle 20, is provided from a single piece of sheet metal in a unitary construction comprising means for tightening or loosening the split band or collar 11 and means for threadedly engaging the associated bolt or screw a which is manipulated for such tightening or loosening of the clamp. The yoke or saddle 20 is provided from a suitable sheet metal blank having a plate-like body portion 21 provided with angularly arranged side flanges 23, Figs. 2 and 4, which are return bent inwardly and under said body 21 to define V-shaped or wedge-shaped grooves having a contour and formation corresponding substantially to the V-shaped or wedge-shaped shoulders 17 on the ends of the split band 11. The arrangement is such that said plate-like body 21 of the yoke 20 bridges the space between the V-shaped shoulders 17 on the ends of the split band 11 with said V-shaped side flanges 23 engaging said V-shaped shoulders 17 in a wedging action to provide a progressively increasing contraction of the split band 11 when said saddle 20 moves from the rear toward the front of the clamp 10. In this regard, the extremities of said side flanges 23, in connected relation with the V-shaped shoulders 17, extend into and slide in the adjacent clearance slots 19 in the band 11, while the outwardly projecting ears 18 on the portions 14 serve as stops limiting the forward movement of the saddle 20 as necessary to prevent any over-tightening which would deform or otherwise damage the clamp.

The yoke or saddle 20 is provided with integral extensions 25, 40 on the ends of the plate-like body 21 thereof and a portion of the longer, rearward extension 25 is bent to provide an upstanding arm or base 26 substantially normal to said body portion 21. The arm or base 26 is provided with a nut portion either by a separate nut attached to said base 26 or by integral thread engaging means equivalent to and threadedly engaging the threads on the associated screw $a$ in the manner of a nut. Preferably an integral nut portion is formed on said arm or base 26 by a pair of integral spaced resilient tongues 28 which are stamped from said base 26 to project outwardly out of the plane thereof and refine a tubular hub which is tapped to provide threads for threadedly engaging the screw $a$ in the manner of a nut. The threads on the resilient tongues 28 have a normal spacing slightly less than the size of the thread convolutions on said screw $a$ so as to engage the same in a frictional gripping action which provides an automatic thread locking action on said bolt or screw $a$.

The projecting arm or base 26 extends into an intermediate inwardly inclined portion 30 forming part of the means for bolstering the arm or base 26 and the nut portion 28 thereon as necessary to withstand the tightening action of said screw $a$. To this end, said intermediate portion 30 extends angularly downwardly from said base 26 and bears upon the plate-like body portion 21 adjacent the forward end of the saddle 20 where it is bent outwardly and upwardly into a forward arm 34. The intermediate portion 30 is provided with a suitable slot defining a screw passage 31 while the forward arm 34 is formed with a screw passage 35, and both of said screw passages 31, 35, respectively, are aligned with the thread opening defined by the spaced tongues 28 on the base or rearward arm 26.

The forward extension 40 on the plate like body 21 of said yoke or saddle 20 is bent outwardly and upwardly into an upstanding outer arm 42 similar to and in close abutting relation to the forward arm 34 on the end of the extension 25. The said outer arm 42 is provided with a similar screw passage 43 in line with the screw passage 35 in the adjacent forward arm 34 and is otherwise permanently united to said arm 34 in any suitable way, as for example, by an integral return bent tab 45 which overlies and connects said arms 34, 42 in fixed, rigid relation to each other. The outer arm 42, accordingly, serves to bolster and reinforce the arm 34 and the contiguous intermediate portion 30 which, in turn, supports the rearward arm or base 26 and the nut portion 28 thereon as necessary to withstand the tightening action of said bolt or screw $a$.

A bracket member 50 is provided in conjunction with the yoke or saddle 20 in slidable connection with the ends of said split band 11, as aforesaid. The bracket 50 is provided as a simple, lightweight U-shaped sheet metal member comprising a bottom wall 51 and spaced end walls 53, 56, at the front and rear of the clamp, respectively. The bottom wall 51 of the bracket is positioned below the ends of the band 11, Fig. 4, and is curved in accordance with the contour of the band 11 to bridge the space between the ends of said split band 11 in cooperation with the body portion 21 of the saddle 20 positioned above said ends of the band 11. The end walls 53, 56, of the bracket 50 project radially outwardly from the band 11, preferably in flush relation with the edges thereof and the adjacent edge portions of the band are suitably cut away to permit this preferred arrangement. The forward end wall 53 of said bracket 50 is provided with an integral apertured boss 54 on the inner face thereof which defines a reinforced bearing for the forward end of the bolt or screw $a$.

The rearward end wall 56 of said bracket 50 is formed with an aperture 57 and washers 58 provided on opposite sides of said aperture 57. The screw $a$ includes a reduced end 60 projecting through said aperture 57 and washers 58 and is secured in any suitable manner, as by peening 61, to retain the rearward end of said screw $a$ in the completed assembly of the clamp. The forward end of said screw $a$ projects through the apertured boss 54 on the forward end wall 53 of the bracket 50 and is provided with an annular groove 64 adjacent the head 65 of said screw $a$. The head 65 of the screw $a$ is formed with a suitable tool receiving recess 66 and is small enough to pass through the screw hole 3 to project from the outer or forward side of the panel B where the annular groove 64 is in position for the application of a C-shaped ring or washer 67 to said annular groove 64 to secure said screw $a$ to the panel B in the completed mounting of the clamp.

It will be appreciated that the completed all sheet metal clamp 10 is a compact relatively lightweight unit which is easily installed in operative position at the rearward side of the instrument panel B, with the band 11 aligned with the instrument opening 1, and the clamp secured in such operative position simply by passing the head 65 of the screw $a$ through the hole 3 to projecting relation at the outer or forward side of said panel B where said C-shaped ring or washer 67 is secured in the annular groove 64 adjacent said screw head 65, as aforesaid. Said screw $a$ is thus secured in the completed mounting of the clamp 10 on the rearward side of the panel B but is readily turned by a tool applied to the tool receiving recess 66 in the head 65 thereof projecting from the forward side of said panel B. The other screw $b$ in the hole 4, may be provided for supporting the clamp in any serviceable way, and in a preferred simplified construction, an integral eye 70 is provided on the lower forward edge of the band 11 and the screw $b$ secured thereto in any suitable manner by a spring nut, or threaded nut N, for example.

In operation, when the screw $a$ is turned counterclockwise to move the yoke or saddle 20 toward its extreme rearward position on the shoulders 17 on the ends of the split band 11, said band is expanded to a size capable of readily receiving the instrument A applied from the forward side of the panel B through the instrument opening 1. Likewise, from the outer or forward side of the panel B, it is a simple matter to turn the screw $a$ clockwise as necessary to cause the band 11 to contract about the instrument body A to secure the same firmly and rigidly in mounted position on the instrument panel B. The action is such that clockwise turning of the screw $a$ causes the yoke or saddle 20 to move forwardly in a manner whereby its wedge-shaped side flanges 23 slide on the wedge-shaped shoulders 17 on the ends 14 of the band 11, thereby drawing said ends of the band 11 toward each other to cause said band 11 to contract and tightly grip the instrument body A.

A reverse action takes place when the screw $a$ is turned counterclockwise whereupon the band 11 is sufficiently loosened to permit the instrument A to be easily and quickly withdrawn from the clamp 10 and dismounted from the outer or forward side of said panel B. When the instrument A is removed, the clamp 10 remains in operative attached position on the inner or rearward side of the panel B in readiness for mounting the same or a similar instrument A in a repetition of the foregoing described procedure by which the instrument A is completely mounted from the outer or forward side of said panel B including tightening of the clamp by clockwise turning of the screw $a$ by a tool requiring access only from outer or forward side of said panel B.

The several sheet metal parts of the clamp preferably are constructed of relatively thin sheet metal the thickness of which is selected according to service requirements and the predetermined size of the instrument to be mounted. The clamp is most effective when the sheet metal parts thereof are provided of spring metal suitably tempered and otherwise treated to give the desired toughness and hardness, particularly in the case of devices intended for heavy duty applications. A cheap and highly satisfactory clamp may be provided by making the sheet metal parts thereof from cold rolled metal such as cold rolled steel which is untempered but of a spring metal nature and capable of providing an effective and reliable instrument mounting, as and for the purposes described.

While the invention has been described in detail with a specific example, such example is intended as an illustration only inasmuch as the invention fully contemplates various modifications which may be provided without departing from the spirit and scope of the invention.

What is claimed is:

1. A clamp comprising a split band, a pair of spaced shoulders provided on said band adjacent the ends thereof and having a substantially V-shaped relation diverging forwardly and axially of said band, a yoke comprising a sheet metal plate extending over the space between said spaced shoulders on the band, flanges on the sides of said plate in slidable engagement with said shoulders on the band, means on the ends of said plate defining a pair of spaced outwardly projecting arms having aligned passages, and means on one of said arms comprising integral tongues or the like defining a nut adjacent the passage therein, a bracket extending under the space between said spaced shoulders on the band and having an outwardly projecting wall provided with a screw passage aligned with said nut on the yoke, and a screw threaded with said nut and extending axially of the band through said aligned passages in said arms on the yoke and retained in rotatable but axially fixed relation in said passage in said outwardly projecting wall of said bracket.

2. A clamp comprising a split band, a pair of spaced shoulders provided on said band adjacent the ends thereof and having a substantially V-shaped relation diverging forwardly and axially of said band, a yoke comprising a sheet metal plate extending over the space between said spaced shoulders on the band, flanges on the sides of said plate in slidable engagement with said shoulders on the band, extensions on the ends of said plate defining a pair of spaced outwardly projecting arms and an intermediate portion supporting said arms in spaced relation, said arms having aligned passages and means on one of said arms comprising integral tongues or the like stamped therefrom defining a nut adjacent the passage therein, a bracket extending under the space between said spaced shoulders on the band and having an outwardly projecting wall provided with a screw passage aligned with said nut on the yoke, and a screw threaded with said nut and extending axially of the band through said aligned passages in said arms on the yoke and retained in rotatable but axially fixed relation in said passage in said outwardly projecting wall of said bracket.

3. A clamp comprising a split band, a pair of spaced shoulders provided on said band adjacent the ends thereof and having a substantially V-shaped relation diverging forwardly and axially of said band, a yoke comprising a sheet metal plate extending over the space between said spaced shoulders on the band, flanges on the sides of said plate in slidable engagement with said shoulders on the band, extensions on end portions of said plate, a pair of spaced upwardly projecting arms defined by said extensions and said arms having aligned passages, one of said extensions comprising an arm and an intermediate portion extending between said arms and having its end abutting the other arm to support said arms in spaced relation, and one of said arms carrying means defining a nut adjacent the passage therein, a bracket extending under the space between said spaced shoulders on the band and having an outwardly projecting wall provided with a screw passage aligned with said nut on the yoke, and a screw engaged in said nut and extending axially of the band through said aligned passages in said arms on the yoke and retained in rotatable but axially fixed relation in said passage in said outwardly projecting wall of said bracket.

4. A clamp comprising a split band, a pair of spaced shoulders provided on said band adjacent the ends thereof and having a substantially V-shaped relation diverging forwardly and axially of said band, a yoke comprising a plate extending over the space between said spaced shoulders on the band, flanges on the sides of said plate in slidable engagement with said shoulders on the band, a pair of spaced outwardly projecting arms on said plate and an intermediate portion supporting said arms in spaced relation, said arms having aligned passages and means carried by one of said arms defining a nut adjacent the passage therein, a U-shaped bracket extending under the space between said spaced shoulders on the band and having spaced outwardly projecting walls provided with screw passages aligned with said nut on the yoke, and a screw threaded with said nut and extending axially of the band through said aligned passages in said arms on the yoke and retained in rotatable but axially fixed relation in said screw passages in said spaced outwardly projecting walls of said bracket.

5. A clamp comprising a split band, a pair of spaced shoulders provided on said band adjacent the ends thereof and having a substantially V-shaped relation diverging forwardly and axially of said band, a yoke comprising a sheet metal plate extending over the space between said spaced shoulders on the band, flanges on the sides of said plate in slidable engagement with said shoulders on the band, means on the ends of said plate defining a pair of spaced outwardly projecting arms having aligned passages and an intermediate portion supporting said arms in spaced relation, and one of said arms carrying means defining a nut adjacent the passage therein, a U-shaped sheet metal bracket extending under the space between said spaced shoulders on the band and having outwardly projecting walls provided with screw passages aligned with said nut on the yoke, and a screw threaded with said nut and extending axially of the band through said aligned passages in said arms on the yoke and retained in rotatable but axially fixed relation in said screw passages in said outwardly projecting walls of said bracket.

6. A clamp comprising a split band, a pair of spaced shoulders provided on said band adjacent the ends thereof and having a substantially V-shaped relation diverging forwardly and axially of said band, a yoke comprising a sheet metal plate extending over the space between said spaced shoulders on the band, flanges on the sides of said plate in slidable engagement with said shoulders on the band, extensions on the ends of said plate defining a pair of spaced outwardly projecting arms having aligned passages, one of said extensions including an intermediate portion supporting said arms in spaced relation, and one of said arms carrying means defining a nut adjacent the passage therein, a U-shaped sheet metal bracket extending under the space between said spaced shoulders on the band and having outwardly projecting walls provided with screw passages aligned with said nut on the yoke, and a screw threaded with said nut and extending axially of the band through said aligned passages in said arms on the yoke and retained in rotatable but axially fixed relation in said screw passages in said outwardly projecting walls of said bracket.

7. A clamp comprising a split band, a pair of spaced shoulders provided on said band adjacent the ends thereof and having a substantially V-shaped relation diverging forwardly and axially of said band, a yoke comprising a sheet metal plate extending over the space between said spaced shoulders on the band, flanges on the sides of said plate in slidable engagement with said shoulders on the band, extensions on the ends of said plate defining a pair of spaced outwardly projecting arms having aligned passages, one of said extensions comprising an arm and an intermediate portion extending between said arms and having its end abutting the other arm to support said arms in spaced relation, and one of said arms carrying means defining a nut adjacent the passage therein, a U-shaped sheet metal bracket extending under the space between said spaced shoulders on the band and having outwardly projecting walls provided with screw passages aligned with said nut on the yoke, and a screw threaded with said nut and extending axially of the band through said aligned passages in said arms on the yoke and retained in rotatable but axially fixed relation in said screw passages in said outwardly projecting walls of said bracket.

8. A clamp comprising a split band, a pair of spaced shoulders provided on said band adjacent the ends thereof and having a substantially V-shaped relation diverging forwardly and axially of said band, a yoke comprising a sheet metal plate extending over the space between said spaced shoulders on the band, flanges on the sides of said plate in slidable engagement with said shoulders on the band, extensions on the ends of said plate providing a pair of spaced outwardly projecting arms having aligned passages, one of said extensions having a substantial Z-shape defining an arm and an intermediate portion inclined inwardly between said arms and having a return bent end abutting the other arm to support said arms in spaced relation, and one of said arms carrying means defining a nut adjacent the passage therein, a U-shaped sheet metal bracket extending under the space between said spaced shoulders on the band and having outwardly projecting walls provided with screw passages aligned with said nut on the yoke, and a screw threaded with said nut and extending axially of the band through said aligned passages in said arms on the yoke and retained in rotatable but axially fixed relation in said screw passages in said outwardly projecting walls of said bracket.

References Cited in the file of this patent

UNITED STATES PATENTS

| | | |
|---|---|---|
| 2,100,604 | Kollsman | Nov. 30, 1937 |
| 2,474,062 | Murphy | June 21, 1949 |
| 2,616,644 | Christophersen | Nov. 4, 1952 |